United States Patent
Meulenbrugge et al.

[11] Patent Number: 5,194,736
[45] Date of Patent: Mar. 16, 1993

[54] X-RAY EXAMINATION APPARATUS INCLUDING A MATRIX OF SENSORS AND DEVICE MEASURING EXPOSURE OF GROUPS OF SENSORS DURING EXECUTION OF AN X-RAY EXPOSURE

[75] Inventors: Hendrik J. Meulenbrugge, Veldhoven, Netherlands; Ulrich Schiebel; Herfried Wieczorek, both of Aachen, Fed. Rep. of Germany

[73] Assignee: U.S. Philips Corp., New York, N.Y.

[21] Appl. No.: 789,221

[22] Filed: Nov. 7, 1991

[30] Foreign Application Priority Data

Nov. 14, 1990 [DE] Fed. Rep. of Germany ....... 4036163

[51] Int. Cl.$^5$ .......................... G01T 1/02; G01T 1/24
[52] U.S. Cl. ............................ 250/370.07; 250/370.09
[58] Field of Search ................ 270/370.09, 370.07, 270/370.11

[56] References Cited

U.S. PATENT DOCUMENTS

| | | |
|---|---|---|
| 3,995,161 | 11/1976 | Lux . |
| 4,689,487 | 8/1987 | Nishiki et al. ............ 250/370.09 |
| 4,747,118 | 5/1988 | Spaak ........................... 378/110 |
| 5,079,426 | 1/1992 | Antonuk et al. ............ 250/370.09 |

FOREIGN PATENT DOCUMENTS

0287197 10/1988 European Pat. Off. .

OTHER PUBLICATIONS

J. P. Doty et al, "Design of Low Noise, High Performance X-ray Charge-Coupled-Device Cameras", Optical Engineering, Oct. 1987, vol. 26, No. 10, pp. 1055–1060.

Primary Examiner—Carolyn E. Fields
Attorney, Agent, or Firm—Jack D. Slobod

[57] ABSTRACT

An X-ray examination apparatus includes a sensor matrix (41) with sensors (1) which are arranged in rows and columns and each of which comprises an X-ray sensitive photosensor element (11) and a storage capacitance (12) which is connected parallel thereto. First electrodes of the sensors are connected to a counter-electrode (2) which receives a direct voltage, second electrodes being connected to an electric switch (13) provided for each sensor. For exposure measurement the currents flowing through the counter-electrode (electrodes) (2) and/or the electric switches (13) after the brief closing of the electric switches (13) and before the reading of the charges are used to measure and/or correct the exposure of groups of the sensors during the execution of an X-ray exposure.

15 Claims, 2 Drawing Sheets

X-RAY EXAMINATION APPARATUS INCLUDING A MATRIX OF SENSORS AND DEVICE MEASURING EXPOSURE OF GROUPS OF SENSORS DURING EXECUTION OF AN X-RAY EXPOSURE

FIELD OF THE INVENTION

The invention relates to an X-ray examination apparatus, comprising a sensor matrix with sensors which are arranged in rows and columns and each of which comprises an X-ray sensitive photosensor element and a storage capacitance connected parallel thereto, first electrodes of the sensors being connected to a counter-electrode which receives a direct voltage, second electrodes thereof being connected to an electric switch which is provided for each sensor and which is switched briefly to its conductive state prior to the execution of an X-ray exposure, the charge of the storage capacitance being read via the switch after the X-ray exposure.

BACKGROUND OF THE INVENTION

An X-ray examination apparatus of this kind comprises a sensor matrix with a plurality of sensors, for example 2000×2000 sensors which are arranged in rows and columns. Each of these sensors comprises an X-ray sensitive photosensor element. In each sensor a storage capacitance is connected parallel to the photosensor element. For example, the stray capacitance of the photosensor element can be used for the storage capacitance. The first electrodes of the photosensor element and the storage capacitance are connected to a counter-electrode which receives a positive or a negative direct voltage, depending on the connection of the photosensor element. The other two electrodes of the photosensor element and the storage capacitance can be connected to a read line via an electric switch. Prior to the execution of an X-ray exposure during which an object to be examined is exposed to the X-rays, the electric switches of all sensors are briefly closed, i.e. switched to the conductive state. After completion of the exposure, the switches of the sensors are closed again to enable reading of the charges stored in the storage capacitances after the X-ray exposure. However, this read operation is not performed simultaneously for all sensors. Only as many sensors can be read simultaneously as there are read lines provided in the sensor matrix. Sensors connected to a common read line are read sequentially in time.

Devices for measuring the intensity of the X-ray exposure are not known for such X-ray examination apparatus. For X-ray examination apparatus utilizing an X-ray image intensifier and optically coupled cameras it is known to uncouple the intensified light optically from the exit screen of the X-ray image intensifier for supply to a light detector for measuring the intensity of the exposure. Such a device is known, for example from EP-A-0 200 272 which corresponds to U.S. Pat. No. 4,747,118 but cannot be utilized for an X-ray examination apparatus of the kind set forth.

SUMMARY OF THE INVENTION

It is an object of the invention to provide an exposure measuring device for an X-ray examination apparatus of the kind set forth.

This object is achieved in accordance with the invention in that after the electric switches have been briefly switched to the conductive state and before the reading of the charges, an exposure measuring device for measuring and/or correcting the exposure is electrically connected to the counter-electrode and/or the electric switch during the execution of an X-ray exposure.

In X-ray examination apparatus comprising the described sensor matrix a problem exists in that the bulk of the charges read, and hence also the intensity of the exposure, is determined only during the reading of the charges from the storage capacitances. However, this is too late because at that instant exposure has already been executed and terminated. The invention is based on the recognition of the fact that during the exposure small currents also flow in the sensors and in the electric switches which are not in conductive state, which small currents can be used for measuring the exposure. These small currents result from the fact that the electric switches have practically inevitable stray capacitances via which charges can flow also during the exposure operation. These currents flow on the one hand through the counter-electrode of each sensor and on the other hand through the electric switches. The measurement of the exposure can be performed at each area separately or at both these areas. The currents flowing are proportional to the instantaneous value of the exposure so that they can be readily used for measurement or correction of the exposure.

In a first version of the invention, a predetermined number of sensors of a column of the matrix forms a group, for each group there being provided a common read line with a respective read amplifier for reading the charge, the read amplifiers also being connected to the exposure measuring device during the exposure.

As has already been stated, a predetermined number of sensors is connected to a common read line via their electric switches. For the formation of the X-ray image the read line already includes a respective read amplifier for amplifying the charges read. During the X-ray exposure these read amplifiers of the various read lines can be already be used to determine the currents then flowing and hence to measure the exposure or also to correct the exposure.

In order to keep the construction of the sensor matrix as simple as possible, all sensors of a column of the matrix can form a group comprising a common read line and a read amplifier.

In a second version of the invention, a predetermined number of sensors forms a respective group, for each group there being provided a common counter-electrode whereto there is connected a respective amplifier via which a signal which depends on the currents flowing in the respective counter-electrodes is applied to the exposure measuring device during the X-ray exposure.

As has already been stated, the measurement of the currents flowing during the X-ray exposure can be performed by measuring the currents flowing through the electric switches. However, it is also possible to measure the currents flowing through the counter-electrodes of the sensors. To this end, a common counter-electrode is provided for a predetermined number of sensors forming a group. Connected to this counter-electrode is an amplifier which amplifies the currents flowing through the counter-electrode. These currents are used for exposure measurement and/or exposure correction. In this embodiment an additional amplifier is required for each counter-electrode, but the advantage exists that the currents flowing through the counter-electrode during X-ray exposure are larger than the currents flowing through the read line. Thus, either a lower amplification suffices or an improved signal-to-noise ratio is obtained.

For this embodiment of the X-ray examination apparatus it has been found that the predetermined number of sensors for which a respective common counter-electrode is provided preferably amounts to from two times two and eight times eight.

In a further embodiment of the invention an individual exposure measurement is carried out for each group of sensors comprising a common read line or a common counter-electrode.

An individual exposure measurement can be performed for each group of sensors in the case where the exposure measurement is performed via the read amplifiers of a sensor group as well as in the case where an amplifier for the measurement of the currents during the exposure is provided in the common counter-electrode of a group of sensors. It is thus possible to perform a separate exposure measurement for individual image areas. This can be particularly attractive in achieving correct exposure of given, important areas of an object to be examined.

To this end, in a further embodiment of the invention the exposure measuring device comprises a control device which controls the exposure intensity and/or the exposure duration in dependence on the exposure measurement or the individual exposure measurements. The control device can determine the instantaneous exposure intensity by measurement of the currents and can correct the exposure intensity, if necessary. Alternatively, or additionally, it is possible to vary the duration of the exposure in dependence on the exposure intensity, so that an overall radiation dose of the desired level is achieved.

In a further embodiment of the invention, the individual exposure measurements are weighted differently in the control device in dependence on the position of the sensors of the various groups. As has already been stated, given areas of the image or given areas of the object to be examined should notably be correctly exposed. To this end, it is advantageous to attach more weight during the exposure measurement to the currents of the sensors associated with the areas of the object to be examined which should definitely be correctly exposed.

In a further embodiment of the invention it is possible for the control device to utilize a weighting table for weighting the various individual exposure measurements in dependence on the relevant type of examination, which weighting table has been composed in advance for the relevant examination. Such a weighting table can be stored as experience values derived from previous examinations. This can be realized for various types of examination for which a respective weighting table is provided for use during the exposure.

For special cases, however, in a further embodiment it is also possible to attach the various weights to the individual exposure measurements by manual selection. To this end, the position of the sensors of the various groups for which the individual exposure measurements are carried out can be displayed on a display device which also serves to display the results of the X-ray exposure, the manual selection being performed on the basis of the display of the positions of the groups on the display device. The positions of the various groups of sensors can be marked on the display device which serves for the display of the exposure results, i.e. the ultimate X-ray image. By manual selection it can thus be indicated which groups are to be taken particularly into account in the determination of the exposure. For example, use can be made of an image formed using a lower dose and displayed on the display device together with the positions of the sensor groups. The groups situated in areas of the object to be examined which are to be exposed in a specific manner can thus be readily selected by hand.

BRIEF DESCRIPTION OF THE DRAWING

An embodiment of the invention will be described in detail hereinafter with reference to the drawing. Therein.

DESCRIPTION OF THE PREFERRED EMBODIMENT

Figure 1:
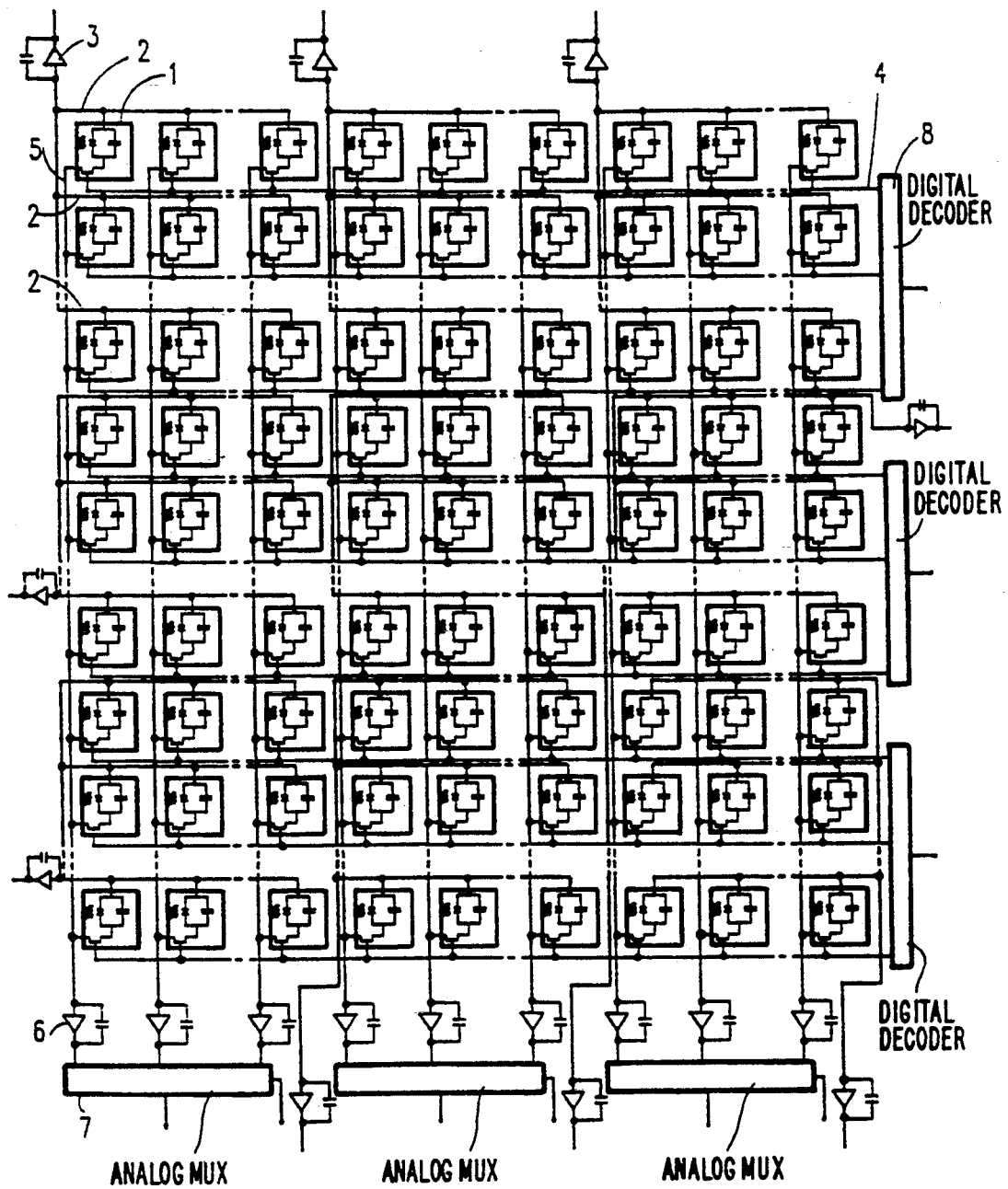
FIG. 1 shows details of a sensor matrix for an X-ray examination apparatus.

FIG. 1 shows a sensor matrix comprising sensors 1 which are arranged in rows and columns and which are to be used in an X-ray examination apparatus. In the representation of FIG. 1, showing only details, each three sensors per row and per column are provided with a common counter-electrode 2. However, it will be evident that a larger or smaller number of sensors can also form such a group such as for example $2 \times 2$ to $8 \times 8$. For each group comprising a common counter-electrode 2 there is provided an amplifier 3 which is arranged in the counter-electrode and which serves to amplify the currents flowing in the counter-electrode during the exposure so as to apply these currents to a exposure measuring device (not shown in FIG. 1) for measurement and/or correction of the exposure.

Subsequent to an X-ray exposure, in the matrix shown in FIG. 1 all electric switches of the sensors 1 of a row are activated via a respective associated switching line 4 so that, via the electronic switches of the sensors 1 of this row, the charges stored in the storage capacitances of the sensors 1 during the exposures are dissipated via read lines 5. For each column of the sensors 1 shown FIG. 1 there is provided a common read line 5 which includes a respective amplifier 6 which amplifies the charges read and supplies the results to an analog multiplexer 7 for further processing. The switching lines 4 are line-wise activated via digital decoders 8.

Subsequent to an exposure, the electric switches of the sensors 1 are thus row-wise activated and the charges of all sensors 1 of a row are read in parallel via the read lines 5. This operation is continued for all rows until the charges of all sensors have been read.

Figure 2:
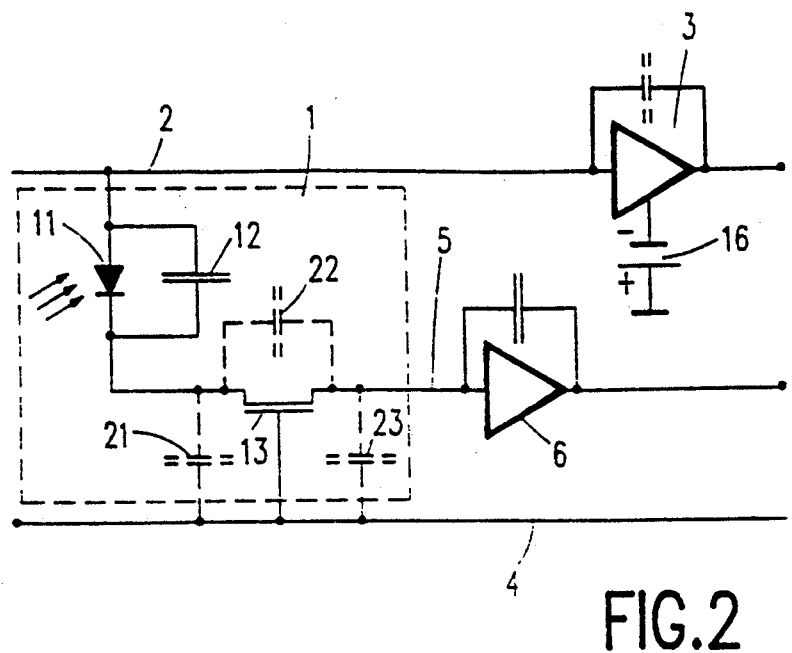
FIG. 2 shows a sensor of the matrix shown in FIG. 1, comprising a counter-electrode and a read line.

FIG. 2 is a detailed representation of a single sensor of the arrangement shown in FIG. 1, stray capacitances denoted by broken lines also being taken into account.

The sensor 1 comprises a photosensor element 11 which becomes conductive when exposed to incident X-rays. Connected parallel to the photosensor element 11 is a storage capacitance 12 which may notably be the stray capacitance of the photosensor element 11. The anode of the photosensor element 11 and a connection of the storage capacitance 12 are connected to a counter-electrode 2 which is also connected to further sensors which are not shown in FIG. 2. The sensor 1 also comprises an electric switch 13 which is constructed as a field effect transistor and whose source is connected to the cathode of the photosensor element 11 and to the second connection of the storage capacitance 12. The gate of the switching element 13 is connected to a switching line 4 which is also connected to electric switches of further sensors not shown in the Figure. The drain of the switching element 13 is connected to a read line 5 which comprises a read amplifier 6. Further sensors which are not shown in FIG. 2 may be connected to the read line 5.

The electric switch 13, shown as a field effect transistor in the Figure, comprises stray capacitances which act between each of its three terminals. A first stray capacitance 21 acts between the source and the gate of the electric switch 13. A second stray capacitance 22 acts between the source and the drain of the switch 13, and a third stray capacitance 23 acts between the drain and the gate of the switch 13.

For the measurement of the exposure the counter-electrode 2 comprises an amplifier 3 which is also connected to the negative terminal of a direct voltage source 16 via which the counter-electrode 2 is negatively biased.

Prior to the execution of an X-ray exposure, the electric switch 13 is briefly switched to its conductive state, so that the cathode of the photosensor element 11 assumes substantially ground potential. When subsequently the X-ray exposure takes place with the switch 13 in its non-conductive state again, the storage capacitance 12 is discharged from an initial state and the common junction of the photosensor element 11, the storage capacitance 12 and the source of the switch 13 becomes more negative, i.e. more negative as the exposure for this sensor element is stronger. After completion of the exposure, the electric switch 13 is activated via the switching line 4 and the decrease in charge is read via the read line 5 and the current integrating amplifier 6 which measures the charge necessary to recharge capacitor 12 to its initial state. This reading is subsequently used to form an X-ray image in a manner not shown in the Figure. Evidently, this charge is also a measure of the exposure executed for the relevant sensor. However, this reading becomes available only after execution of the exposure so that it cannot be used for exposure measurement during the exposure.

Therefore, in accordance with the invention the currents flowing in the counter-electrode 2 and/or the electric switch 13 during the exposure are used for the exposure measurement. The currents flowing during the exposure are caused by the stray capacitances 21 and 22 of the electric switch 13. A current is coupled into the counter-electrode 2 via the capacitance 21, a current being coupled into the read line 5 via the capacitance 22. Because the capacitance 21 is usually greater than the capacitance 22, the current flowing to the counter-electrode during the exposure is substantially larger than the current flowing in the read line, so that it can be more readily used for the exposure measurement. To this end, the counter-electrode 2 comprises the amplifier 3. The currents amplified by the amplifier 3 are a direct measure of the instantaneous intensity of the exposure of the photosensor element 11 and can be used directly for the exposure measurement.

It is also possible to utilize the current flowing in the read line 5 during the exposure; this current has a value smaller than the current flowing in the counter-electrode 2, but it can be amplified by the already present read amplifier 6.

Figure 3:
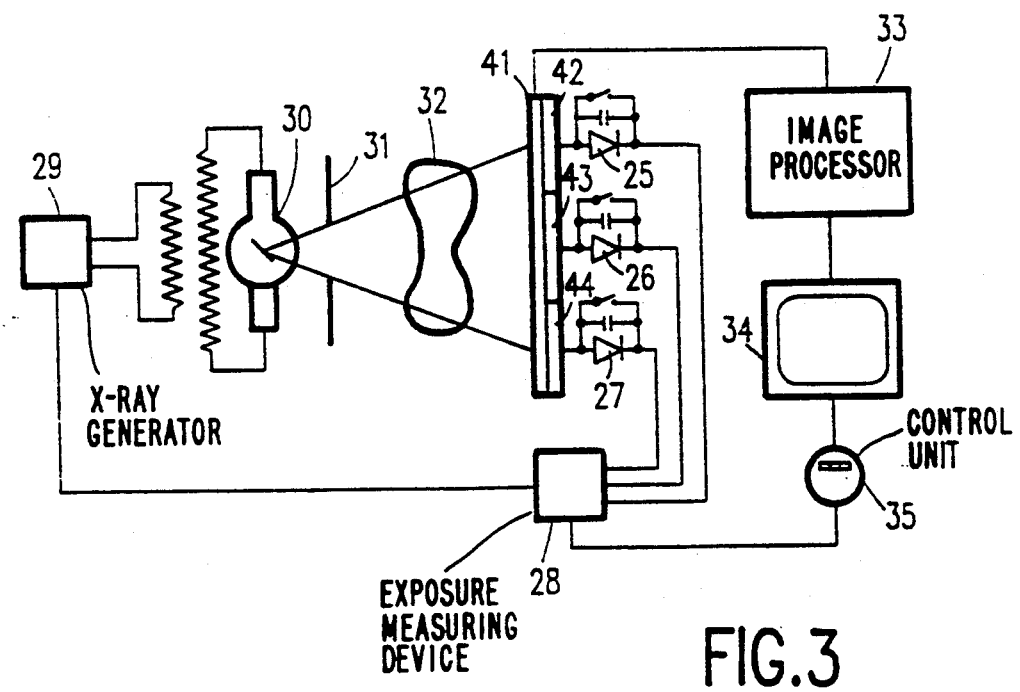
FIG. 3 shows an X-ray examination apparatus comprising a matrix as shown in FIG. 1.

FIG. 3 diagrammatically shows an X-ray examination apparatus which comprises a sensor matrix 41. The sensor matrix 41 itself comprises a plurality of groups of sensors with a common counter-electrode; FIG. 3 shows only the sensor groups 42, 43 and 44 comprising a respective amplifier 25, 26 and 27 connected in the counter-electrodes provided for the respective groups. The outputs of the amplifiers 25, 26 and 27 are applied to an exposure measuring device 28 which controls an X-ray generator 29. An X-ray source 30 is coupled to the X-ray generator 29 so as to irradiate, via a diaphragm 31, an object 32 to be examined, the sensor matrix 41 being arranged behind the object, viewed from the X-ray source 30. In order to extract an X-ray image, the read lines of the sensor matrix 41 (not shown in FIG. 3) are connected to an image processor 33 whose output signal is applied to an image display device 34. The exposure measuring device 28 is connected to a control member 35 which itself is coupled to the image display device 34.

During an exposure of the object 32 to be examined, the X-rays produced by the X-ray source 30 are incident on the object to be examined, traverse the object and are incident on the sensor matrix 41. The sensors provided in the sensor matrix 41 but not shown in FIG. 3 are thus exposed to X-rays so that charges are stored in the storage elements of the individual sensors in dependence on the intensity of the exposure of each individual sensor. These charges are read and processed, using the image processor 33, so as to form an X-ray image which is displayed on the image display device 34.

The aim is to enable control of the exposure. To this end, use is made of the currents flowing in the counter-electrodes of the sensor groups, the groups 42 and 43 and 44 being shown in FIG. 3. The currents are amplified by means of the amplifiers provided in the counter-electrodes, the amplifiers 25, 26 and 27 being shown in FIG. 3. The amplified currents are evaluated in the exposure measuring device 28. The exposure measuring device 28 can automatically perform the control or correction of the exposure for which it can utilize for example previously established evaluation tables. For different types of examination there may be provided appropriately adapted evaluation tables. Because the exposure measuring device 28 receives the currents flowing in the various sensor groups during the exposures individually for each sensor group, the device can perform an individual measurement of the exposure for each individual sensor group. For the automatic exposure correction, more weight as regards the desired exposure can be attached to given groups than other groups, depending on the type of examination.

It is also possible, using the control unit 35, to preset which of the individual exposure measurements of the sensor groups have to be weighted more. To this end, the position of the various sensor groups can be indicated in the image on the image display device 34, so that the position of the groups is directly recognizable and the sensor groups which have to be weighted more or less are also known.

For further clarification of the relative position of the sensor groups with respect to the object 32 to be examined, a preliminary image can be formed by means of a lower radiation dose, which image is displayed on the display device 34 so as to further facilitate the selection of the sensor groups for the exposure measurement or correction.

We claim:

1. An X-ray examination apparatus, comprising a sensor matrix with sensors that are arranged in rows and columns, each sensor being connected between a read line and a counter-electrode and comprising an electric switch in series with a parallel combination of an X-ray sensitive photosensor element and a storage capacitance, means for selectively switching the switch of a sensor from a non-conductive state to a conductive state to complete a circuit path including the read line, the storage capacitance of the sensor, the counter-electrode and a D.C. source for a time interval after the execution of an X-ray exposure of said sensor matrix, said circuit path including read means connected to said read line for forming a first signal, responsive to a current flow in said read line during said time interval, indicating a change in a charge of the storage capacitance of the sensor after the execution of said X-ray exposure and an exposure measuring device coupled to one of the counter-electrode and the read line of a plurality of said sensors for in response to current flowing in the one of the read line and the counter-electrode during the execution of said X-ray exposure forming a second signal comprising an exposure measurement of a plurality of said sensors.

2. An X-ray examination apparatus as claimed in claim 1 wherein a predetermined number of sensors of the matrix forms a group, for each group there being provided a common read line, said read means comprising a respective read amplifier connected to each common read line having an output for the first signal, each read amplifier coupling the exposure measuring device to each common read line by feeding the exposure measuring device from said output during the execution of the X-ray exposure.

3. An X-ray examination apparatus as claimed in claim 2, wherein all sensors of a column of the matrix form a respective group comprising a common read line and a read amplifier.

4. An X-ray examination appartus as claimed in claim 2 wherein an individual exposure measurement is carried out for each group of sensors comprising a common read line or a common counter-electrode.

5. An X-ray examination apparatus as claimed in claim 4 wherein the individual exposure measurements are weighted differently in the exposure measuring device in dependence on the position of the sensors of the various groups.

6. An X-ray examination apparatus as claimed in claim 5, wherein for the weighting of the various individual exposure measurements in dependence on the relevant type of examination, the exposure measuring device utilizes a weighting table which has been composed in advance for the relevant type of examination.

7. An X-ray examination apparatus as claimed in claim 4 wherein the exposure measuring device comprises a control unit which controls at least one of the exposure intensity and the exposure duration in dependence on the respective exposure measurement or the individual exposure measurements.

8. An X-ray examination apparatus as claimed in claim 1, wherein a predetermined number of sensors form a respective group, for each group there being provided a common counter-electrode whereto there is connected a respective amplifier via which a signal which depends on the currents flowing in the respective counter-electrode is applied to the exposure measuring device during the X-ray exposure.

9. An X-ray examination apparatus as claimed in claim 8, wherein the predetermined number of sensors of each group for which a respective common counter-electrode is provided amounts to from two times two to eight times eight.

10. An X-ray examination apparatus as claimed in claim 9 wherein an individual exposure measurement is carried out for each group of sensors comprising a common read line or a common counter-electrode.

11. An X-ray examination apparatus as claimed in claim 10 wherein the exposure measuring device comprises a control unit which controls at least one of the exposure intensity and the exposure duration in dependence on the respective exposure measurement or the individual exposure measurements.

12. An X-ray examination apparatus as claimed in claim 11 wherein the individual exposure measurements are weighted differently in the exposure measuring device in dependence on the position of the sensors of the various groups.

13. An X-ray examination apparatus as claimed in claim 12 wherein for the weighting of the various individual exposure measurements in dependence on the relevant type of examination, the exposure measuring device utilizes a weighting table which has been composed in advance for the relevant type of examination.

14. An X-ray examination apparatus as claimed in claim 1 wherein the exposure measuring device comprises a control unit which controls at least one of the exposure intensity and the exposure duration in dependence on the respective exposure measurement or individual exposure measurements.

15. An X-ray examination apparatus as claimed in claim 14 wherein the individual exposure measurements are weighted differently in the exposure measuring device in dependence on the position of the sensors of the various groups.

* * * * *